United States Patent
Janelid

[15] 3,643,426
[45] Feb. 22, 1972

[54] POWERPLANT DRIVEN BY A GAS TURBINE, AND A METHOD OF OPERATING SUCH A POWERPLANT

[72] Inventor: Ingvar Janelid, Forsetevagen 18, Djursholm, Sweden

[22] Filed: June 29, 1970

[21] Appl. No.: 50,726

[30] Foreign Application Priority Data

June 30, 1969 Sweden..................................9298/69

[52] U.S. Cl....................................60/39.02, 61/.5, 290/52
[51] Int. Cl. ..............................................................F02c
[58] Field of Search..............290/52; 61/.5; 60/39.02, 39.03

[56] References Cited

UNITED STATES PATENTS

| | | | |
|---|---|---|---|
| 2,433,896 | 1/1948 | Gay | 290/52 |
| 3,151,250 | 9/1964 | Carlson | 290/52 |
| 3,538,340 | 11/1970 | Lang | 290/52 |
| 3,523,192 | 8/1970 | Lang | 290/52 |

FOREIGN PATENTS OR APPLICATIONS 772,287  4/1957  Great Britain..........................60/39.02

OTHER PUBLICATIONS

Popular Science, July 1959, pg. 80

*Primary Examiner*—Mark M. Newman
*Assistant Examiner*—Warren Olsen
*Attorney*—Pierce, Scheffler and Parker

[57] ABSTRACT

A powerplant is driven by a gas turbine. The compressed air for the gas turbine is accumulated in a rock chamber. The rock chamber communicates through a conduit with a lake, so that the rock chamber can receive water to any desired level. A pump is arranged in said conduit, to assist the flow of water from the lake to the rock chamber, or vice versa.

8 Claims, 5 Drawing Figures

POWERPLANT DRIVEN BY A GAS TURBINE, AND A METHOD OF OPERATING SUCH A POWERPLANT

This invention relates to a method of operating a powerplant driven by a gas turbine. It is known that it is advantageous in such powerplants to use an air accumulator which, for example, may consist of a rock chamber which is in communication with a lake, the surface of the lake being on a higher level than the rock chamber. During periods when there is excess power available, the air compressors of the gas turbine force compressed air into the air accumulator, so that a corresponding volume of water is displaced. During periods when there is a considerable demand for power, water is permitted to run into the accumulator, and the compressed air thus displaced is led to the gas turbine. Thus during these periods it is not necessary for the gas turbine to supply any power to generate compressed air, and the entire output from the gas turbine can be used to generate power to be used during the periods or hours of the day when peak load prevails.

In known powerplants of this type the air pressure in the rock chamber cannot exceed the maximum pressure of the compressor. The principle object of the invention is to provide a powerplant in which the air pressure in the rock chamber can exceed the maximum pressure of the compressor. It is then possible to extract a higher output than normal from the gas turbine for short periods. According to the invention this is achieved by forcing water out of the rock chamber when the power requirement is low, to a recipient or reservoir having a relatively low level and, when the power requirement is high, allowing water to flow into the rock chamber from a water store having a relatively high level.

When the air store is being emptied of compressed air, therefore, the water flows in from a level situated higher than the reservoir to which the compressor usually forces out the water. This can be achieved either by taking water from a lake, river or the like, situated at a higher level, or by pumping the water up to a water store situated in, or in the vicinity of the supply shaft to the rock chamber.

When the air store in a known powerplant of this type is filled with compressed air, the water level in the air store drops, whereas the water level in the reservoir, for example a lake, is hardly altered. This means that while the air store is being filled, the compressor will operate with an increasing counterpressure. One object of the invention is to keep this counterpressure constant. According to the invention this is achieved by forcing water up out of the rock chamber with the help of compressed air from the air compressor, when the power requirement is low, to a level which lies lower than the reservoir and which is kept at a constant height above the falling water level in the rock chamber, and by pumping up water from said level to the reservoir.

For the same reason, in known powerplants of this type the air pressure in the rock chamber will fall when the rock chamber is being emptied, i.e., when water is allowed in. One object of the invention is to provide a power station in which the air pressure in the rock chamber is kept constant when air is taken out of the rock chamber. According to the invention this is achieved by regulating the supply of water to the rock chamber from the water store, when the power requirement is high, in such a way that the water level in the supply shaft to the rock chamber is kept at a constant height above the rising water level in the rock chamber.

The invention will be described more fully in the following with reference to the accompanying drawings.

FIG. 1 shows schematically a powerplant according to the invention with the water store and reservoir at different levels.

FIG. 2 also shows a water store and a reservoir at different levels, but in this case the water store can be supplied with water by means of pumps.

Figure 1:
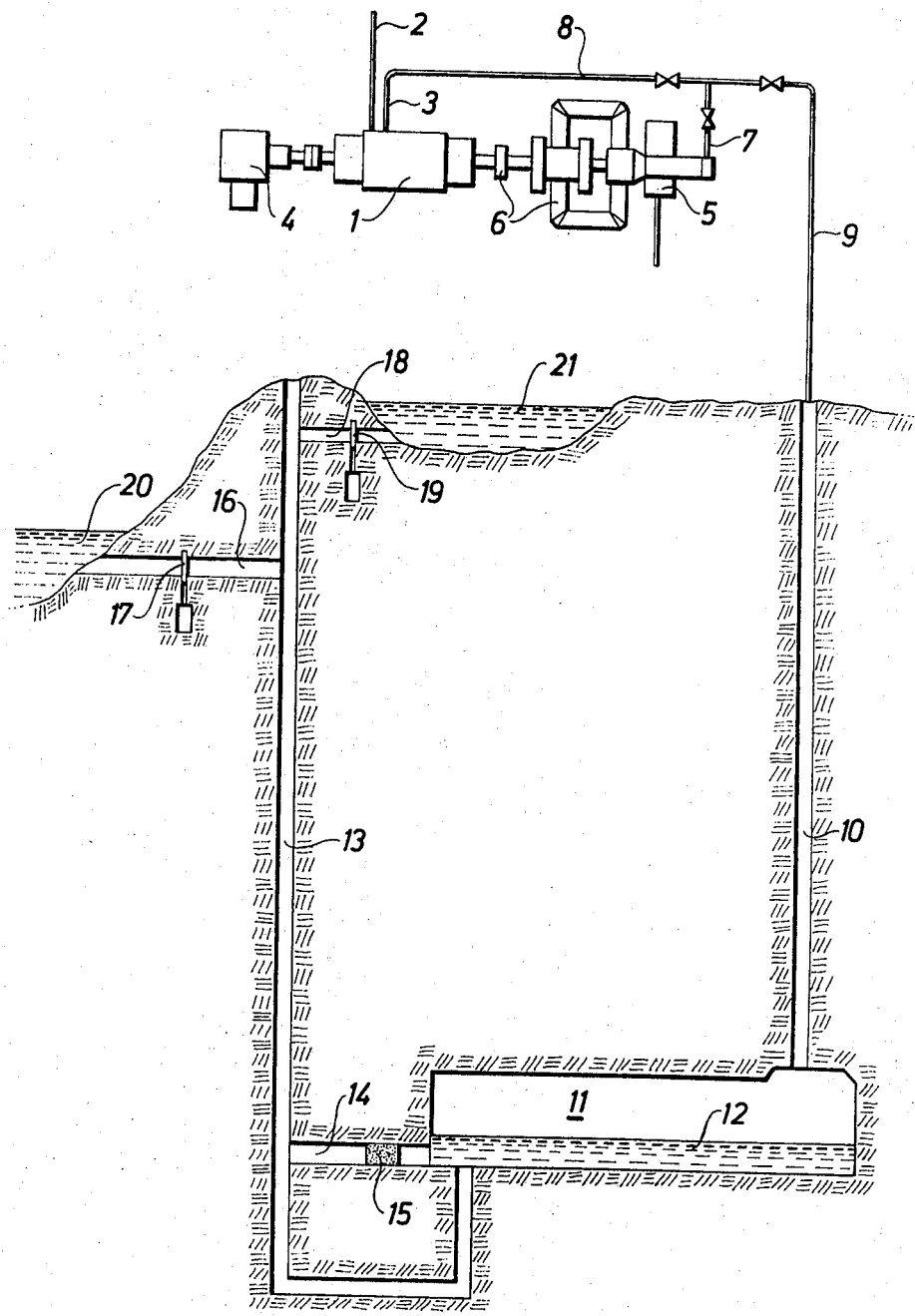

The powerplant according to FIG. 1 comprises a gas turbine 1 having an inlet 2 for oil and an inlet 3 for compressed air. The gas turbine 1 drives an electricity generator 4 and, via a coupling 6, an air compressor 5. The compressed-air outlet 7 of this communicates via a conduit 8 with the air inlet 3 of the gas turbine, and communicates via a conduit 9 and a shaft 10 with a rock chamber 11. The rock chamber 11 is connected to a vertical shaft 13 which communicates via a tunnel 16 having a valve 17 with a lake 20 serving as recipient or reservoir. The shaft 13 also communicates via a tunnel 18 having a valve 19 with a water store 21. This is at a higher level than the reservoir 20 and may consist of a lake, dam or pond or a river with sufficient flow. A tunnel 14, used as a transport tunnel during blasting of the rock chamber 11, has been sealed by means of a concrete wall 15.

The powerplant according to FIG. 1 operates in the following way: During periods of low power requirement the air compressor 5 supplies compressed air to the gas turbine 1 and to the rock chamber 11. The water level 12 in the rock chamber falls and the water is forced through the shaft 13 up to the reservoir 20, valve 17 being kept open and valve 19 closed. During periods of high power requirement the air compressor 5 is disconnected by means of the coupling 6 so that the entire output of the gas turbine 1 can be used to drive the generator 4. The necessary compressed air is taken during these periods from the rock chamber 11 by keeping the valve 17 closed and the valve 19 open so much that water from the store 21 flows down into the rock chamber and provides the desired air pressure for the gas turbine. During peak-load, if the valve 19 is kept wide open, it is possible to make use of the entire level difference between the water surfaces in the water store 21 and the rock chamber 12.

Figure 2:
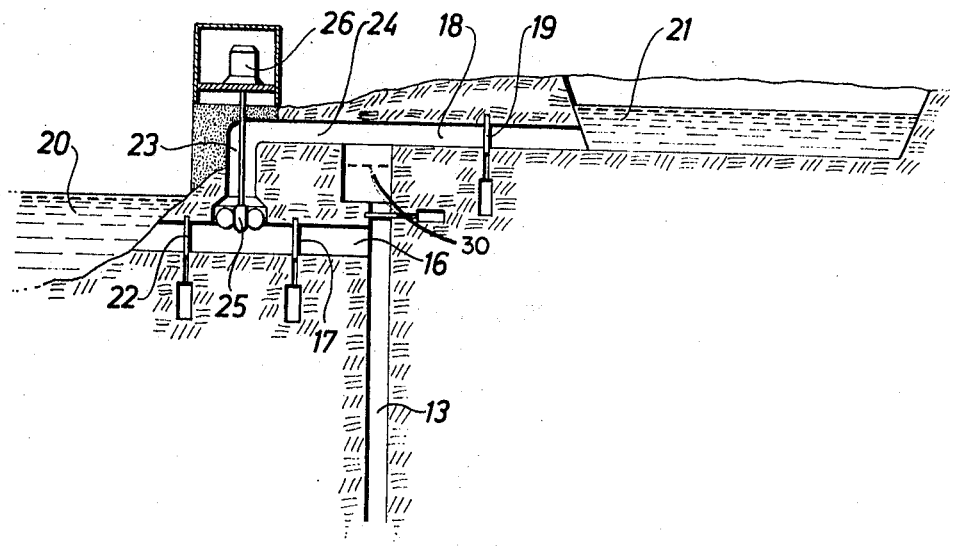

In FIG. 2 the same reference numerals have been used as in FIG. 1 for corresponding parts. The water store 21 is assumed here to consist of a dam or pond construction. A second valve 22 has been arranged in the tunnel 16 as well as the valve 17. Between these valves is a pump 25 which is driven by a motor 26. During low-load the rock chamber is filled with compressed air and the water in the rock chamber flows through the shaft 13 and the tunnel 16 to the reservoir 20. At the same time the pump 25 pumps water up through a shaft 23, a tunnel 24 and the tunnel 18 to the water store 21. During high-load the valve 17 is closed. The pump 25 can still operate and thus pumps up water from the reservoir 20 through the shaft 23 and tunnel 24 to the level 30 in the upper part of the shaft 13. At the same time the valve 19 is regulated so that the quantity of water received by the shaft 13, both from the tunnel 24 and the tunnel 18, corresponds to the desired quantity of compressed air. By regulating the valve 19 the water level 30 in the shaft 13 is adjusted to a level corresponding to the desired air pressure.

Figure 3:
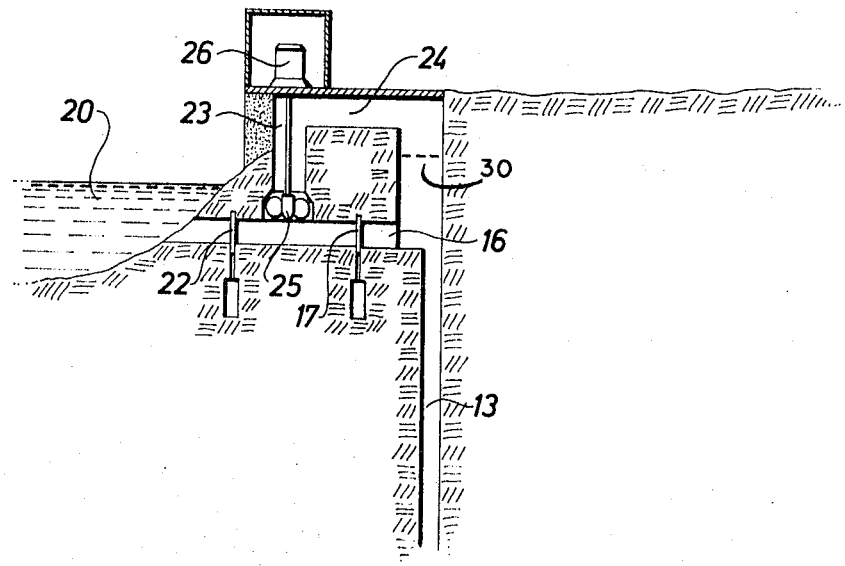
FIGS. 3 and 4 show two arrangements where the same lake is used as both water store and reservoir and where an artificial high-water level is maintained by means of pumps.

In the arrangement according to FIG. 3 the lake 20 serves alternately as water store and reservoir. During low-load the water in the rock chamber is forced through the shaft 13 and tunnel 16 out into the reservoir 20. During high-load the valve 17 is closed and the pump (or pumps) 25 pumps water from the water store 20 through the shaft 23 and tunnel 24 to the level 30 in the upper part of the shaft 13. The pump 25 must therefore have at least as large a capacity as the desired volume of compressed air. By regulating the pumping rate the water level 30 in the upper part of the shaft 13 can be adjusted as desired. If the level difference between the tunnels 16 and 24 is the same as or greater than the height of the rock chamber, the difference in water level between the rock chamber and the shaft 13 can be kept constant, i.e., the compressed air taken out of the rock chamber can be kept at a constant pressure.

Figure 4:
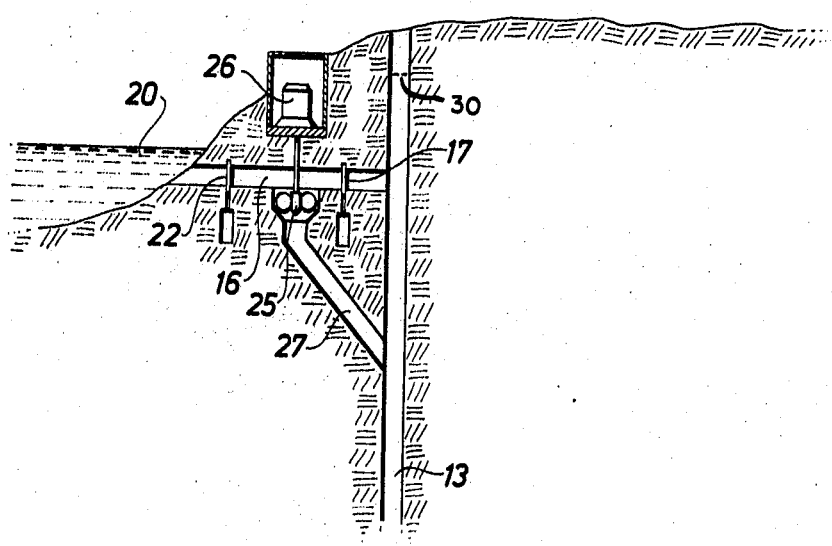

The arrangement according to FIG. 4 is very similar to that according to FIG. 3. The shaft 23 and tunnel 24 according to FIG. 3, however, have in FIG. 4 been replaced by a shaft 27 extending obliquely downwardly from the tunnel 16 to the shaft 13. At high electric output the pump 25 is started and forces water from the water store 20 down into the shaft 13 with such pressure and in such a quantity that the water surface 30 in the shaft is at the desired level. The valve 17 is kept closed.

Figure 5:
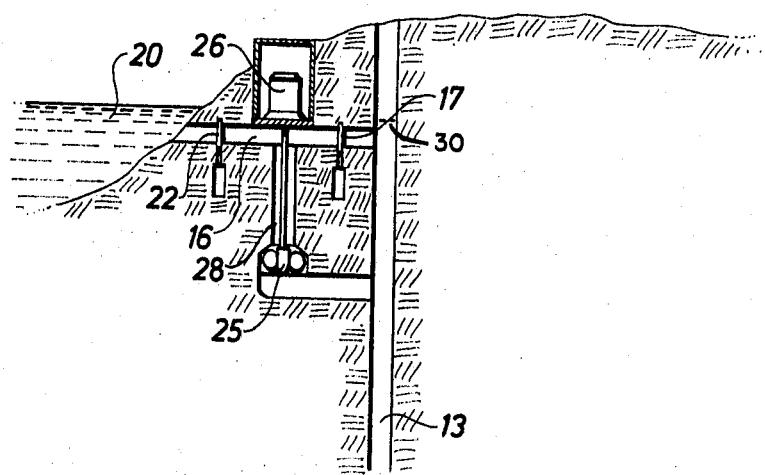
FIG. 5 shows an arrangement where the water transport from the rock chamber to the reservoir to a certain height is attended to by pumps.

The arrangement according to FIG. 5 comprises a shaft 28 extending downwardly from the tunnel 16 to the shaft 13. The pump 25 is placed in the shaft 28 at such a level that it is slightly below the level to which the air compressor of the gas turbine is able to force up the water from the rock chamber. The pump 25 thus lifts the water the remaining distance up to the reservoir 20. The valve 17 is kept closed. The air compressor should preferably be of such a type that, operating at a reduced capacity, it is able to force water up from the rock chamber all the way to the reservoir 20, for example if there is a fault in the pump equipment. During high-load both the valves 17 and 22 are kept open so that water from the water store 20 flows through the tunnel 16 to the shaft 13. If the pump is reversible a pressure level higher than that corresponding to the reservoir 20 can be obtained.

What is claimed is:

1. Method of operating a powerplant driven by a gas turbine in which, when the power requirement is low, the air compressor of the gas turbine forces compressed air into a rock chamber and thus forces out of the rock chamber a corresponding volume of water, and in which, when the power requirement is high, water is allowed into the rock chamber and thus forces out a corresponding volume of compressed air from the rock chamber to the gas turbine, during which time the compressor is disconnected, characterized in that, when the power requirement is low, water is forced out of the rock chamber to a relatively low level and, when the power requirement is high, water is allowed into the rock chamber from a water store having a relatively higher level.

2. Method according to claim 1, characterized in that, when the power requirement is low, water from the rock chamber is forced, with the help of compressed air from the air compressor, up to a first level which lies lower than that of the reservoir and that water is pumped by pumps from said first level up to the reservoir.

3. Method according to claim 2, characterized in that said first level is held at a constant height above the falling water level in the rock chamber.

4. Method according to claim 1, characterized in that, when the power requirement is high, the supply of water from the water store to the rock chamber is controlled in such a way that the water level in the supply shaft to the rock chamber is kept at a constant height above the rising water level in the rock chamber.

5. Method according to claim 1, characterized in that, when the power requirement is high, water is pumped up from the water store (20 in FIG. 2) to a higher level (30 in FIG. 2) in the supply shaft of the rock chamber.

6. Method according to claim 5, characterized in that, when the power requirement is high, water is also supplied to the supply shaft from a second water store (21 in FIG. 2) and that, when the power requirement is low, water is pumped up from the first-mentioned water store (20) to the second water store (21).

7. A powerplant comprising a gas turbine, an electricity generator driven by said gas turbine, an air compressor driven by said gas turbine, a compressed air accumulator arranged to receive compressed air from the air compressor and to deliver compressed air to the gas turbine, a water store situated at a level higher than the compressed air accumulator, a water conduit between the water store and the compressed air accumulator for permitting water to flow from the water store to the compressed air accumulator and vice versa, and a pump in said water conduit for assisting the flow of water in said water conduit which has a branch extending to a level higher than that of the water store, the pump being designed to pump water from the water store to the water conduit to maintain in said branch a water level higher than that of said water store.

8. A powerplant as claimed in claim 7, in which the pump is reversible so as to be able to assist the flow of water both from the water store to the compressed air accumulator and in the reverse direction.

* * * * *